(12) United States Patent
Tanaka et al.

(10) Patent No.: US 8,387,043 B2
(45) Date of Patent: Feb. 26, 2013

(54) USB PORT SHARED CONTROL METHOD IN A PLURALITY OF VIRTUAL MACHINES

(75) Inventors: Youji Tanaka, Zama (JP); Yukari Hatta, Hadano (JP); Hideaki Toufuku, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 994 days.

(21) Appl. No.: 12/359,441

(22) Filed: Jan. 26, 2009

(65) Prior Publication Data

US 2009/0204965 A1    Aug. 13, 2009

(30) Foreign Application Priority Data

Feb. 7, 2008   (JP) ................................. 2008-027761

(51) Int. Cl.
*G06F 9/455*  (2006.01)
*G06F 9/46*  (2006.01)

(52) U.S. Cl. ........................................... 718/1
(58) Field of Classification Search ........................ None
See application file for complete search history.

(56) References Cited

U.S. PATENT DOCUMENTS

| | | | |
|---|---|---|---|
| 5,506,975 A | | 4/1996 | Onodera |
| 7,213,246 B1* | | 5/2007 | van Rietschote et al. .......... 718/1 |
| 2003/0041205 A1* | | 2/2003 | Wu et al. ........................ 710/302 |
| 2005/0198632 A1* | | 9/2005 | Lantz et al. ......................... 718/1 |
| 2005/0240685 A1* | | 10/2005 | Keys ................................. 710/8 |
| 2006/0064523 A1 | | 3/2006 | Moriki et al. |
| 2007/0043928 A1* | | 2/2007 | Panesar et al. ................. 711/206 |
| 2007/0044108 A1* | | 2/2007 | Panesar et al. ................ 719/321 |
| 2007/0300223 A1* | | 12/2007 | Liu ................................... 718/1 |
| 2008/0086728 A1* | | 4/2008 | Lam et al. ......................... 718/1 |
| 2008/0235757 A1* | | 9/2008 | Li ..................................... 726/1 |
| 2009/0006690 A1* | | 1/2009 | Vembu et al. ................. 710/113 |
| 2009/0006702 A1* | | 1/2009 | Sarangdhar et al. .......... 710/305 |

FOREIGN PATENT DOCUMENTS

| | | |
|---|---|---|
| JP | 6-187178 | 7/1994 |
| JP | 2003-202999 | 7/2003 |
| JP | 3100747 | 1/2004 |
| JP | 2006-085543 | 3/2006 |

OTHER PUBLICATIONS

JP Office Action for Japanese Application No. 2008-027761, issued on Sep. 25, 2012, with partial translation.

* cited by examiner

*Primary Examiner* — Corey S Faherty
(74) *Attorney, Agent, or Firm* — Antonelli, Terry, Stout & Kraus, LLP.

(57) ABSTRACT

A USB port shared control method executed by a hypervisor controlling port sharing among virtual machines and having a physical USB host controller including a physical register, the virtual machines each including a virtual USB host controller having a virtual register. The method includes performing sharing by: selectively allocating the physical register to the virtual register of a subject virtual USB host controller provided in a subject virtual machine of the plurality of virtual machines to occupy and unitize the USB port by the subject virtual machine, and directly reading or writing of the physical register by the subject virtual machine via the subject virtual USB host controller, to thereby allow the subject virtual USB host controller to directly control the physical USB host controller. More particularly, the allocating, reading and writing are switched from subject virtual machine to subject virtual machines to facilitate sharing.

3 Claims, 4 Drawing Sheets

USB PORT SHARED CONTROL METHOD IN A PLURALITY OF VIRTUAL MACHINES

INCORPORATION BY REFERENCE

The present application claims priority from Japanese application JP2008-027761 filed on Feb. 7, 2008, the content of which is hereby incorporated by reference into this application.

BACKGROUND OF THE INVENTION

The present invention is related to a USB (Universal Serial Bus) port shared control method and pertains, in particular, to a USB port shared control method making it possible to let a plurality of virtual machines jointly utilize a physical USB host controller with which a USB device is connected via a physical USB port installed in a physical machine, and to let a single virtual machine occupy and utilize a physical USB port.

Normally, in case a USB device is connected with a USB port, the connection state is reflected in the PORTSC register which displays or controls the state of the port in the register of the physical USB host controller. And then, the USB drive of the computer, observing the contents of this PORTSC register, starts control of the physical port.

Moreover, in order to let a virtual machine use the physical USB host controller installed in the physical machine, virtualization of the USB host controller in the virtual machine is necessary. The virtualization of a USB host controller in a virtual machine such as this is implemented by carrying out, by means of shared technology based on device virtualization, device emulation with respect to the physical USB host controller by means of a hypervisor configured inside the host computer carrying out the control generating a plurality of virtual machines inside the physical machine.

Further, as prior art pertaining to the sharing of I/O devices in a virtual machine, there is known the technology reported in JP-A-2006-855431 (corresponding to U.S. Patent Publication No. 2006/0064523) etc.

SUMMARY OF THE INVENTION

However, since the USB device connected with the physical USB port is used for a virtual machine, control showing the connection state reflected in the aforementioned PORTSC register to the USB driver in the virtual machine became necessary, so processing therefor has become necessary.

And then, in order to stably operate a hardware device supplied by a hardware vendor on a virtual machine, the result is that device control for virtualization of the USB host controller and physical USB host controller control is installed on an emulating hypervisor, but, even if an attempt was made to virtualize the physical USB host controller, it is extremely difficult, using the prior art reported in the aforementioned reference JP-A-2006-85543, to guarantee complete operation of hardware supplied by vendors while ensuring quality and performance, there being numerous cases in which the detailed specifications and the like of hardware supplied by vendors are not made public.

It is an object of the present invention, taking the aforementioned point into consideration, to furnish, in a hypervisor controlling a virtual machine, a USB port shared control method devised to limit, so as to carry out as little as possible, control of a physical device conforming to a USB host controller hardware specification which is generally made public, and so that a USB host controller device driver operating in an OS (Operating System) in a virtual machine can occupy and carry out the utilization of a USB port, via a physical USB host controller.

According to the present invention, the aforementioned object is, in a USB port shared control method letting a plurality of virtual machines, configured inside a physical machine, jointly utilize a physical USB host controller installed in the physical machine, attained by the fact that: the aforementioned physical machine has a hypervisor constituting a plurality of virtual machines; and the concerned hypervisor logically installs the aforementioned physical USB host controller as virtual USB host controllers in the aforementioned plurality of virtual machines, and, with respect to the USB port controlled by the aforementioned physical host controller, confers utilization rights to a single virtual machine and lets it exclusively utilize the aforementioned USB port via the aforementioned physical USB host controller.

According to the present invention, since the utilization rights are switched so that a certain single virtual machine can occupy and utilize the physical USB port, it is possible, for the USB host controller device driver operating in an OS in the virtual machine, to occupy and carry out the utilization of the USB port via the physical USB host controller.

Other objects, features and advantages of the invention will become apparent from the following description of the embodiments of the invention taken in conjunction with the accompanying drawings.

DESCRIPTION OF THE EMBODIMENTS

Hereinafter, a description of an embodiment of a USB port shared control method according to the present invention will be given in detail by means of the drawings.

Figure 1:
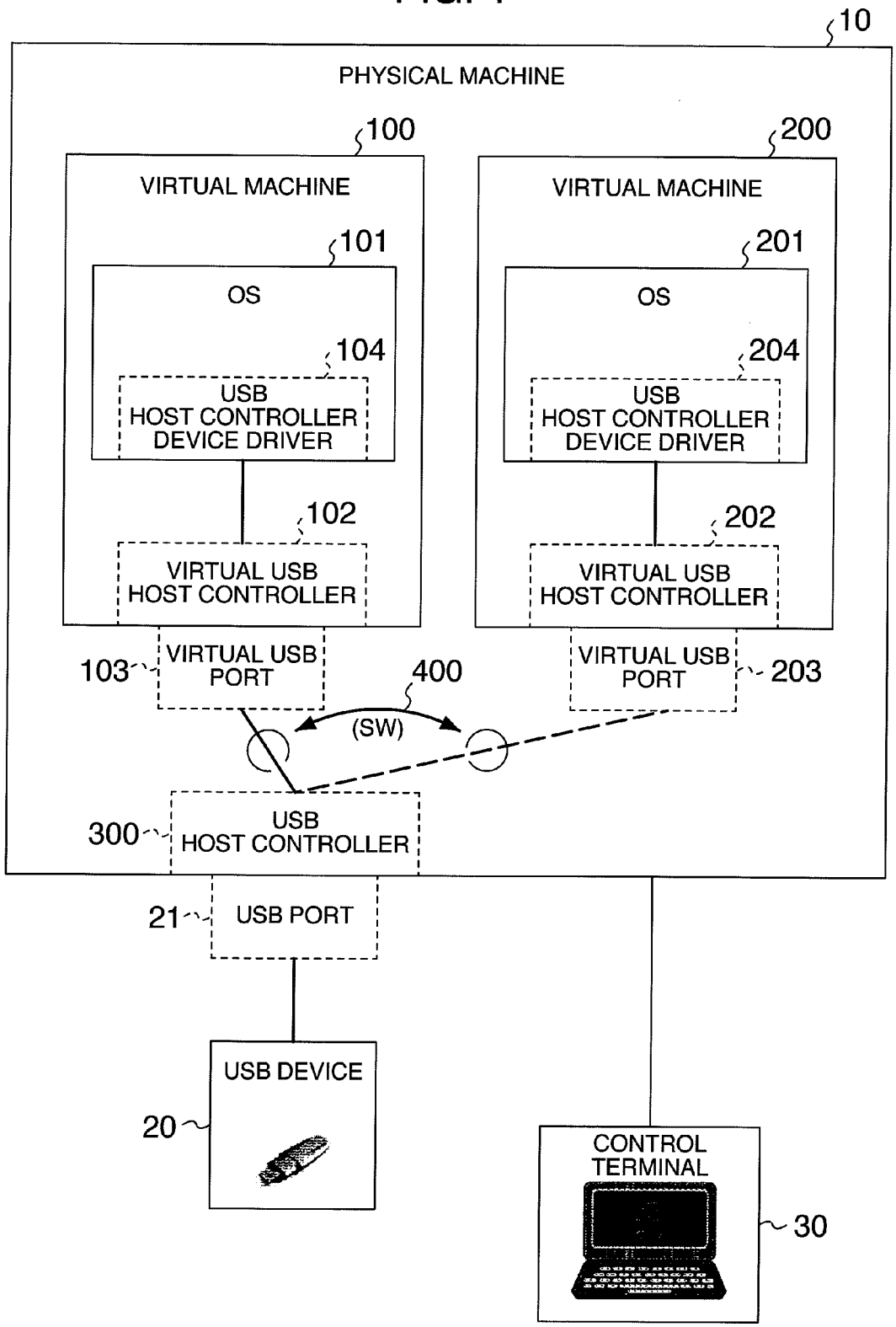
FIG. 1 is a block diagram showing the configuration of a virtual machine system switching a USB port, allocating the port utilization rights exclusively to a single virtual machine, and sharing the USB port.

FIG. 1 is a block diagram showing the configuration of a virtual machine system switching a USB port, allocating the port utilization rights exclusively to a single virtual machine, and sharing the USB port.

In a physical machine 10 shown in FIG. 1, a plurality of virtual machines 100 and 200 are operably constructed and a physical USB host controller 300 and a USB port 21 serving as a control port thereof are provided. And then, a USB device 20 acting as an I/O device is taken to be connectable with USB port 21. Although not shown in FIG. 1, this physical machine 10 is configured by comprising a CPU (Central Processing Unit), a RAM (Random Access Memory), a ROM (Read Only Memory), a HDD (Hard Disk Drive), and the like; a hypervisor is constructed by the CPU's executing a program stored inside the HDD using a RAM; and by means of the control of this hypervisor, a plurality of virtual machines are constructed inside physical machine 10.

Virtual machines 100 and 200 have virtual USB host controllers 102 and 202 and virtual USB ports 103 and 203 acting as control ports thereof, and inside virtual machines 100 and 200, there operate OS (Operating Systems) 101 and 201 comprising USB host controller device drivers 104 and 204. And then, virtual USB host controllers 102 and 202 are controlled by USB host controller device drivers 104 and 204.

As for the example shown in FIG. 1, it shows a state in which physical USB host controller 300 is directly controlled by virtual USB host controller 102, USB host controller device driver 104 of OS 101 in virtual machine 100 occupies USB port 21, and USB device 20 is taken to be controllable. At this point, OS 201 of virtual machine 200 controls virtual USB host controller 202, and, by means of SW (Switch) 400, it is devised so that access cannot be made to physical USB host controller 300, and for this reason, it does not occur that USB host controller device driver 204 is changed while left in the state of virtual USB port 203 or in a state not connected with a USB device.

SW 400 is a switching means for letting one of the plurality of virtual machines occupy physical USB host controller 300 and USB port 21, provided in physical machine 10, that can switch direct control rights to physical USB host controller 300 (that is, a right for directly controlling with respect to physical USB host controller 300), controlled by means of an instruction due to the system administrator from control terminal 30 connected with physical machine 10, to either of virtual USB host controller 201 or 202 and let virtual machine 100 or 200 use USB port 21.

Figure 2:
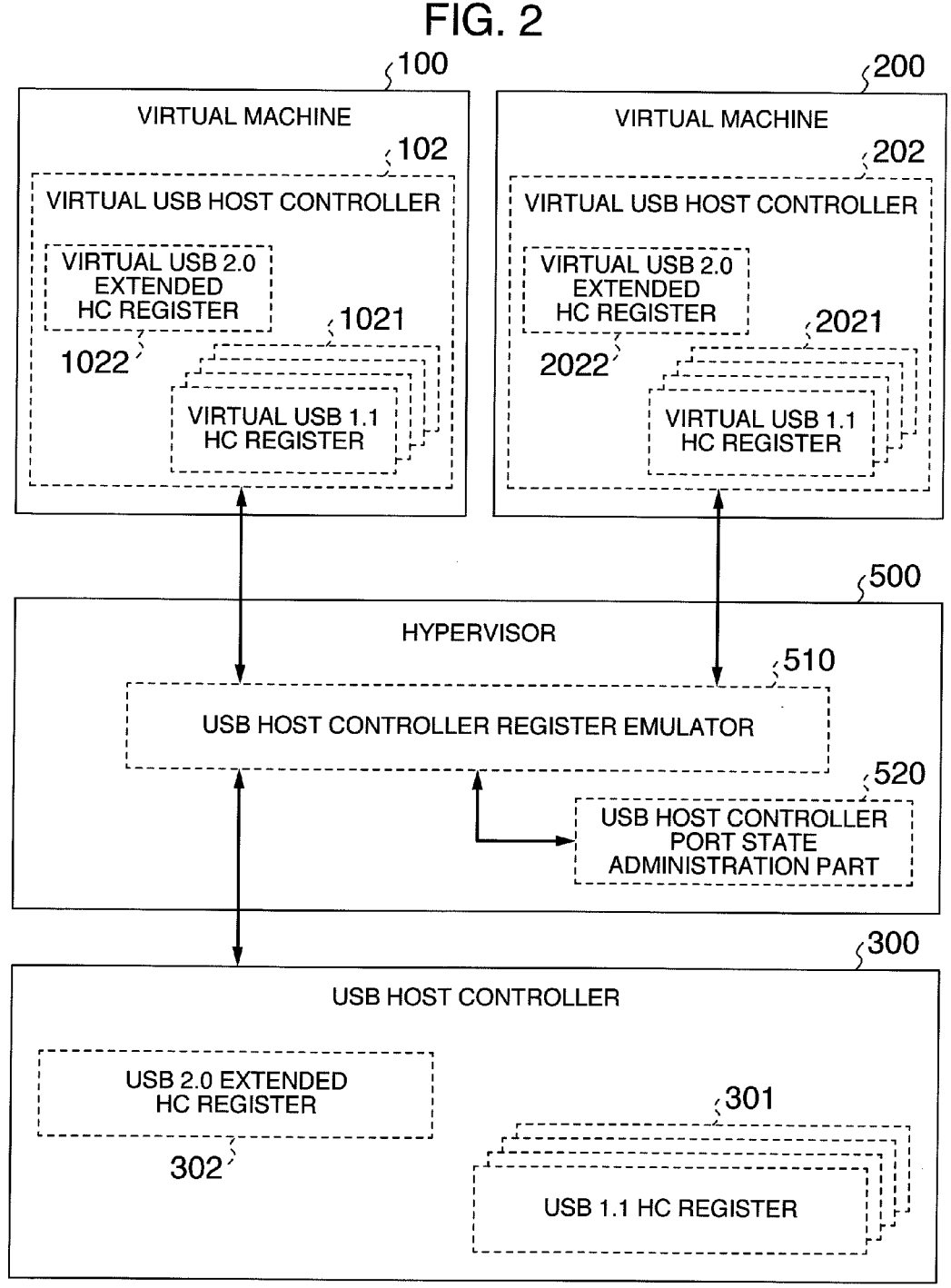
FIG. 2 is a diagram explaining the control function of a hypervisor for virtualizing a physical USB host controller and conferring it to a virtual machine.

FIG. 2 is a diagram explaining the control function of a hypervisor for virtualizing a physical USB host controller and conferring it to a virtual machine.

In physical USB host controller 300, there are USB 1.1 host controller and a USB 2.0 host controller, and in order to implement these functions, there are provided USB 1.1 host controller registers 301 and a USB 2.0 extended host controller register 302. Further, in FIG. 2, USB 1.1 host controller registers 301 are shown as existing in several copies, but this is for using, in the case where there are provided several pairs of a physical USB host controller 300 and a USB port 21 provided in physical machine 10 shown in FIG. 1, different ones for the different pairs. Also, in physical USB host controller 300, there may, in the same sense, be provided a plurality of USB 2.0 extended host controller registers 302.

And then, as already explained, inside physical machine 10, there is configured a hypervisor 500 constructing a plurality of virtual machines 100 and 200. Hypervisor 500 is configured by being provided with a USB host controller register emulator 510 and a USB host controller port state administration part 520. In order to make virtual USB host controllers 102 and 202, by which physical USB host controller 300 is virtualized, visible to virtual machines 100 and 200, USB host controller register emulator 510 of hypervisor 500 emulates the register structure of registers 301 and 302 possessed by physical USB host controller 300 and, also, with respect to physical USB host controller 300, directly reports read and write requests for register access to and from virtual host controller 102 or 202 to control physical USB host controller 300.

By emulation with a register configuration based on the aforementioned USB host controller register emulator 510, the result is that, inside virtual USB host controllers 102 and 202 visible from virtual machines 100 and 200, there are provided virtual USB 1.1 host controller registers 1021 and 2021 and virtual USB 2.0 extended host controller registers 1022 and 2022.

USB host controller port state administration part 520 carries out administration of USB port 21 of physical USB host controller 300, i.e. the control of the physical control rights letting a virtual machine use USB port 21. In this way, it becomes possible to carry out exclusive control of the utilization of USB port 21 with hypervisor 500.

Figure 3:
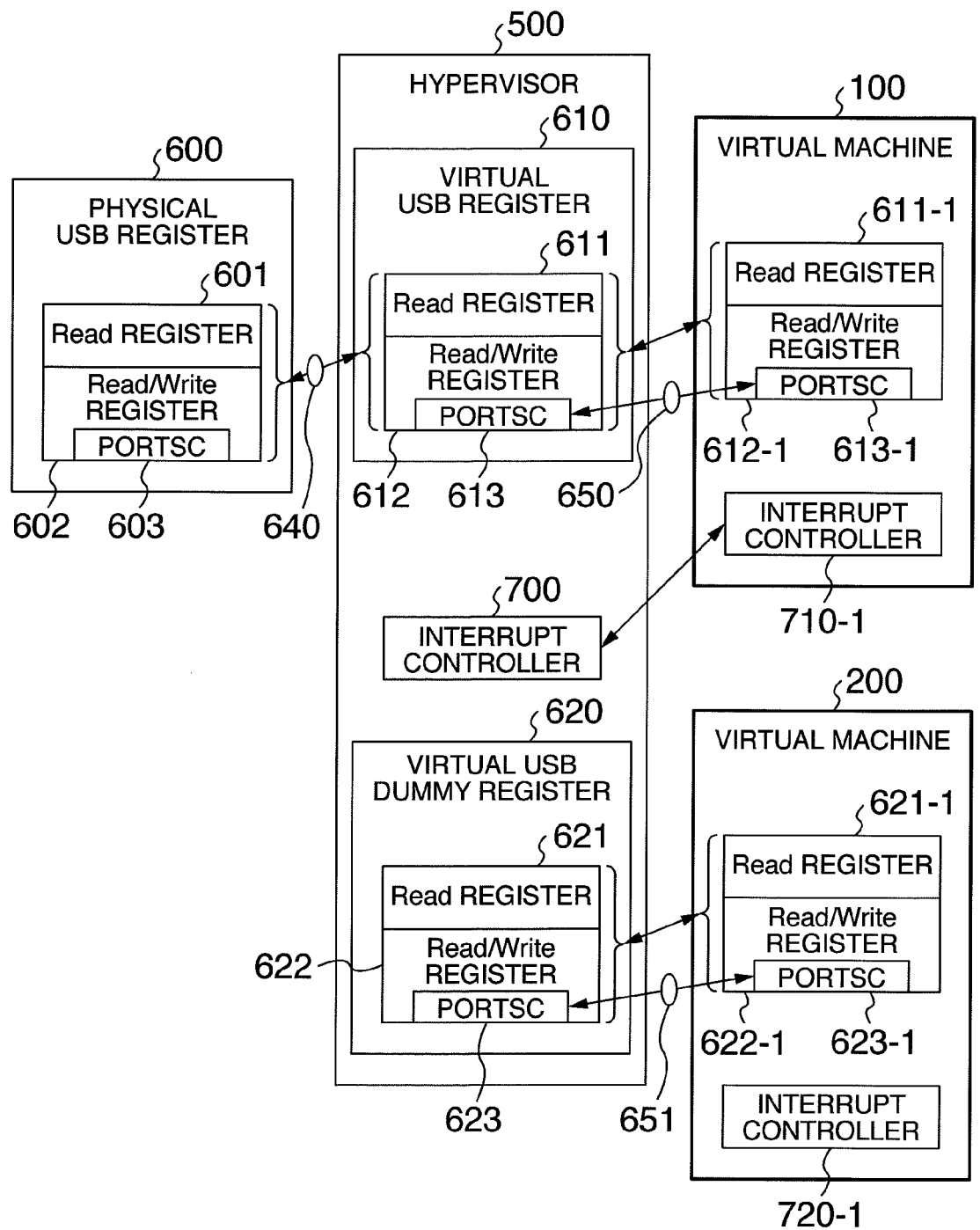
FIG. 3 is a diagram showing the relation between a physical register of a physical USB host controller register and a register holding a hypervisor, in the case of letting a single virtual machine exclusively use a USB port via a physical USB host controller.

FIG. 3 is a diagram showing the relation between a physical register of a physical USB host controller register and a register holding a hypervisor, in the case of letting a single virtual machine exclusively use a USB port via a physical USB host controller, and, with reference to this diagram, an explanation will be given regarding the mechanism of implementing, by means of register emulation, times with utilization rights, as well as impossibility of utilization, to control a physical USB port with respect to a virtual machine.

In FIG. 3, a physical USB register 600 is a register corresponding to USB 1.1 host controller register 301 or USB 2.0 extended host controller register 302, inside physical USB host controller 300 shown in FIG. 2, and is a USB register defined on the basis of a PCI (Peripheral Component Interconnect) specification or a public specification of a USB host controller. And then, this physical USB register 600 is configured by means of a Read attribute register 601, a Read/Write attribute register 602, and a PORTSC register 603 displaying or controlling the port state thereof.

Hypervisor 500 shows registers 611 to 613 and registers 621 to 623, which are mirrors of each register constituting the aforementioned physical USB register 600, as USB registers 611-1, 612-1, and 613-1, and USB registers 621-1, 622-1, and 623-1, to virtual machines 100 and 200, respectively. In the example shown in FIG. 3, hypervisor 500 carries out emulations 640 and 650 validating PORTSC register 613 and confers the utilization rights of the physical USB port to virtual USB register 610.

Further, in FIG. 3, the situation is shown as if virtual USB register 610 and virtual USB dummy register 620 were provided inside hypervisor 500, but since, as mentioned above, hypervisor 500 is only making physical USB register 600 visible to the virtual machines, it does not hold virtual USB register 610 and virtual USB dummy register 620 which act as entities.

By seeing PORTSC register 613, virtual machine 100 is able to learn that a physical USB port is occupied by its own computer and possible to use. And then, if USB device 20 is mounted in USB port 21, physical USB host controller 300 issues an interrupt command from a not illustrated interrupt issuing part that is provided in its own controller 300 and makes hypervisor 500 detect the mounting of the USB device. The aforementioned interrupt command is transferred, via an interrupt controller 700 of hypervisor 500, to an interrupt controller 710-1 of virtual machine 100 which is a virtual machine in which a physical USB port is occupied and possible to use. In this way, the virtual machine learns that USB device 20 is mounted in USB port 21 and that access to USB device 20 has become possible, carries out a Read/Write request to physical USB register 600, controls the USB port, and can occupy USB device 20 mounted in the concerned USB port and start use thereof. And then, virtual machine 100 executes transmission and reception of data to and from USB device 20 via a signal line, not shown in FIG. 3, for data transfers which are set via the hypervisor.

Moreover, there is allocated a virtual USB dummy register 620 of hypervisor 500 to virtual machine 200 and hypervisor 500 carries out an emulation 651 making PORTSC register 623 invalid, and since it is devised so as not to receive a report from an interrupt controller 720-1, it does not occur that this dummy register exerts an influence on physical register 600 regarding a request or a report from virtual machine 200.

Figure 4:
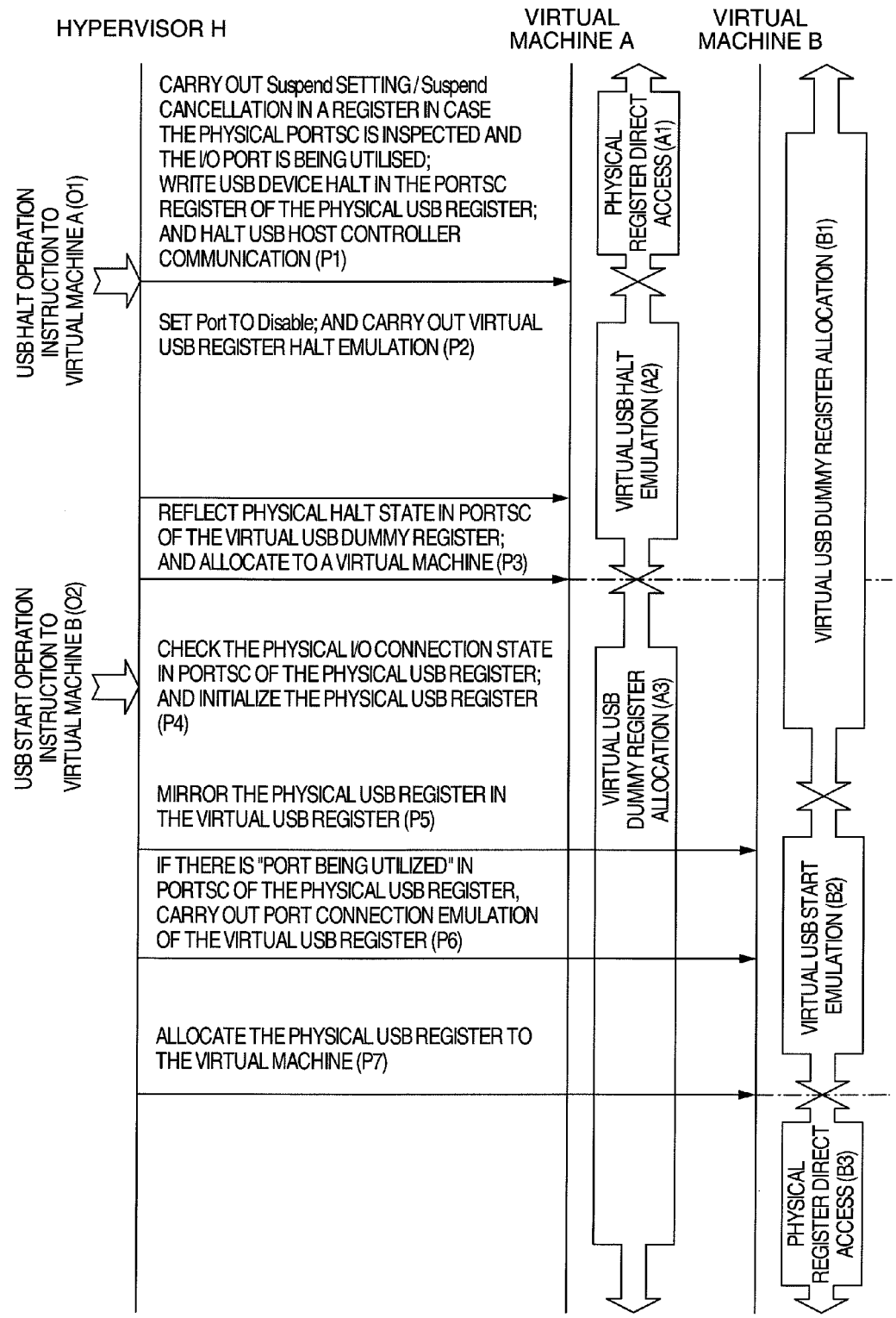
FIG. 4 is a flowchart describing the functioning of processes in the hypervisor, associated with a USB start operation for allocating the utilization rights of a physical port to a virtual machine and a USB halt operation for removing the utilization rights from the virtual machine.

FIG. 4 is a flowchart describing the functioning of processes in the hypervisor, associated with a USB start operation for allocating the utilization rights of a physical port to a virtual machine and a USB halt operation for removing the utilization rights from the virtual machine; next, an explanation regarding this will be given.

1. Now, virtual machine A is in physical register direct access state A1 and is in a state of being able to utilize a physical USB port, and virtual machine B is in virtual USB dummy register allocation state B1, which is taken to be that it is a state in which exclusive utilization of the USB port is impossible.
2. In the aforementioned state, if a USB halt operation instruction O1 from an administrator or the like to virtual machine A via a control terminal 30 is requested of a hypervisor H, hypervisor H, since it carries out a virtual USB halt emulation A2, inspects the physical PORTSC register of the physical USB register, and, in order to temporarily discontinue the utilization of the USB port in case the USB port is being utilized, carries out a Suspend setting and a cancellation in the physical PORTSC register; carries out a USB device halt write in the PORTSC register of the physical USB register and processing halting USB host controller communication, being data transmission and reception which is carried out between virtual machine 100 and USB device 20 (Process P1); and halts the access to the physical USB.
3. Thereafter, hypervisor H sets the USB port to Disable and carries out a virtual USB register halt emulation (Process P2). Next, hypervisor H, by reflecting a physical halt state in the PORTSC register of the virtual USB dummy register and carrying out processing to make an allocation to a virtual machine (Process P3), halts the utilization of the USB port from the USB driver control of virtual machine A. In this state, virtual machine A and virtual machine B take on a state in which the virtual USB dummy registers are allocated and the utilization of the USB port becomes impossible from both of the virtual machines.
4. Next, if a USB start operation instruction O2 from an administrator or the like to virtual machine B is requested of hypervisor H via control terminal 30, hypervisor H, after having temporarily checked the physical I/O connection state in the PORTSC register of the physical USB register and carried out physical USB register initialization processing by means of the same operation (Process P4), carries out processing mirroring the physical USB register in the virtual USB register corresponding to virtual machine B, in order to carry out virtual USB start emulation B2 (Process P5).
5. Further, in case a USB device is connected with the physical USB port, hypervisor H carries out port connection emulation processing for a virtual USB register (Process P6) and, adjusting to the state in which it is connected with the port, carries out the processing to allocate the USB register to virtual machine B (Process P7) and starts physical register direct access B3 and lets virtual machine B start utilization of the USB port.

According to the aforementioned embodiment of the present invention, since it is possible for the hypervisor to carry out exclusive control so as to carry out allocation, with respect to a certain single virtual machine having direct access utilization rights, of physical USB registers, it becomes possible for the single virtual machine to occupy and utilize the USB port.

Also, according to the embodiment of the present invention, from the physical host controller, it looks like the virtual USB host controller is mounted to a plurality of respective virtual machines, so it becomes possible to switch the utilization rights of, and utilize, the physical USB port with a certain single virtual machine, and since it is possible to utilize the USB port by occupying it, not necessitating a recognition again of the USB host controller, the OS of the virtual machine can omit emulation processing concerned with I/O drive control based on a hypervisor and reduce overhead based thereon.

In addition, according to the embodiment of the present invention, since it is possible to carry out the development of installing fake overwrites of the physical host controller for the unmounting and mounting of a USB device in a USB port, and virtual USB host controller emulations, without emulating any host controller specifications, one can reduce the man-hours, expenses, and time related to development, making it possible to strive for cost reductions.

As for the processing in the hypervisor, associated with the aforementioned embodiment of the present invention, it is possible to have it executed by a CPU configured by a program and provided by a physical machine, and also, it is possible to supply the same programs on a recording medium such as a FD (Floppy Disk), a CDROM (Compact Disc Read Only Memory), or a DVD (Digital Versatile Disc); in addition, it is possible to supply the same by means of digital information via a network.

As for the embodiment of the present invention described in the foregoing, in case of taking into account the USB utilization state on a virtual machine in a server system, there is generally assumed the case of its being utilized for the uses of OS installation and driver installation or user data input and output, but in the case where there is normally no necessity of mounting a USB device in a USB port and operating it, it is a valid utilization method to utilize the USB device by switching the utilization of the USB port based on operations from the administrator, since it is assumed that the USB device is treated as a temporary external medium.

Moreover, as for the aforementioned embodiment of the present invention, since, on the occasion of a modification in the utilization between virtual machines of a USB device connected with a physical machine, an OS restart or a renewed search of the USB host controller is not taken to be necessary, so it is possible to utilize the device driver in a stable manner.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A Universal Serial Bus (USB) port shared control method which is executed by a hypervisor in order for the hypervisor to control sharing of the USB port among a plurality of virtual machines, in a computer which comprises a physical USB host controller being configured to include a physical register and to control the USB port and the hypervisor that constitutes the plurality of virtual machines each including a virtual USB host controller having a virtual register, the method comprising:

selectively allocating the physical register to the virtual register of a first virtual USB host controller provided in a first virtual machine of the plurality of virtual machines to occupy and unitize the USB port by the first virtual machine, and directly reading or writing of the physical register by the first virtual machine via the first virtual USB host controller, to thereby allow the first virtual USB host controller to directly control the physical USB host controller;

emulating halt of the USB port with respect to the first virtual machine in response to an instruction from an outside and allocating a dummy register reflecting a halt state to the virtual register of the first virtual USB host controller to thereby halt utilization of the USB port by the first virtual machine; and selectively allocating the physical register to the virtual register of a second virtual USB host controller provided in a second virtual machine of the plurality of virtual machines to occupy and unitize the USB port by the second virtual machine, and directly reading or writing of the physical register by the second virtual machine via the second virtual USB host controller, to thereby allow the second virtual USB host controller to directly control the physical USB host controller.

2. The USB port shared control method according to claim 1, wherein the occupying and unitizing the USB port by the second virtual machine, includes a substep of emulating connection of the USB port with respect to the second virtual machine when a USB device is connected with the USB port.

3. The USB port shared control method according to claim 2, further comprising:

when an interrupt command is issued from the physical USB host controller, selectively transmitting the interrupt command to the second virtual machine occupying and unitizing the USB port.

* * * * *